(12) United States Patent
Miller et al.

(10) Patent No.: US 6,587,668 B1
(45) Date of Patent: Jul. 1, 2003

(54) METHOD AND APPARATUS FOR A CORPORATE EDUCATION SYSTEM

(75) Inventors: Adam L. Miller, Santa Monica, CA (US); Anthony C. Christopoulos, Pasadena, CA (US); Steven D. Seymour, West Hollywood, CA (US)

(73) Assignee: Cyberu, Inc., Santa Monica, CA (US)

( * ) Notice: Subject to any disclaimer, the term of this patent is extended or adjusted under 35 U.S.C. 154(b) by 93 days.

(21) Appl. No.: 09/846,602

(22) Filed: Apr. 30, 2001

(51) Int. Cl.$^7$ .................................. G09B 3/00
(52) U.S. Cl. ........................................ 434/350
(58) Field of Search ............................. 434/350, 322, 434/323, 118, 219

(56) References Cited

U.S. PATENT DOCUMENTS

| | | | |
|---|---|---|---|
| 5,105,365 A | * | 4/1992 | McDaniel et al. ............ 702/24 |
| 6,163,732 A | * | 12/2000 | Petke et al. ................. 700/106 |
| 6,498,920 B1 | * | 12/2002 | Simon ......................... 434/350 |
| 2002/0077884 A1 | * | 6/2002 | Sketch ......................... 705/12 |
| 2002/0142274 A1 | * | 10/2002 | Fujino ......................... 434/219 |

FOREIGN PATENT DOCUMENTS

| | | | | |
|---|---|---|---|---|
| JP | 2002-41676 A | * | 2/2002 | ............ G01F/17/60 |
| WO | WO 02/29759 A2 | * | 4/2002 | ............ G09B/3/00 |

* cited by examiner

*Primary Examiner*—Hieu T. Vo (57) ABSTRACT

An enterprise wide integrated training system. On-line training offering are aggregated into a searchable database. A corporation is a model in a relational database with each employee modeled as a user object have rights defined by the corporation and customized on an individual basis. A user interface permits access to the on-line offerings based on the defined rights. The user interface provides a portal for access to a corporate knowledge base that may be accessed for just in time training or to query an expert regarding a specific topic. Off-line training is facilitated through an entity wide events calendar individually adapted for the particular user based or attributes of the corresponding user object.

44 Claims, 8 Drawing Sheets

Toolbar: Divisions   HIERARCHY VIEW

Division name: [      ] [Go]

View without hierarchy

Add new division

| CORPORATE DIVISIONS: CYBERU | | | | | | | | |
|---|---|---|---|---|---|---|---|---|
| Division | Business Training | Self Development | Skills Training | Specialized Training | Support Training | Technical Training | LRS and Web | Levels |
| ⊟ Main | Y Edit | Y Edit | N | N | N | Y Edit | N | Levels Edit Del |
| ⊞ CEG Client Services | Y Edit | Y Edit | N | N | N | Y Edit | N | Levels Edit Del |
| ⊞ CEG States | Y Edit | Y Edit | N | N | N | Y Edit | N | Levels Edit Del |
| ⊞ Executive | Y Edit | Y Edit | N | N | N | Y Edit | N | Levels Edit Del |
| ⊞ Human Resources | Y Edit |  | N | N | N | Y Edit | N | Levels Edit Del |
|   ⊞ Training |  |  | N | N | N | Y Edit | N | Levels Edit Del |
| ⊞ Network Administration | Y Edit | Y Edit | Y Edit | N | Y Edit | Y Edit | N | Levels Edit Del |
| ⊟ Online Sales | Y Edit |  | N | N |  | Y Edit | N | Levels Edit Del |
|   ⊞ CES Enterprise2 |  |  |  | N | N | Y Edit | N | Levels Edit Del |
| ⊞ OSG | Y Edit | Y Edit | N | N | N | Y Edit | N | Levels Edit Del |

CYBER U    CES Administration

Copyright © 2000-2001 CyberU Inc. All rights reserved. | 4/25/2001 9:08 PM | Corporate Administration Toolbar | Logout

Toolbar: Divisions: Corporate Sales Levels

Copy levels from another division | Copy levels to subdivisions | Add new level

| LEVELS IN THE CORPORATE SALES DIVISION | | | | | | | | |
|---|---|---|---|---|---|---|---|---|
| Rank Level | Sales Price | Price Visible | Expert Areas | Req'd Apprs | Electives | Courses | Competency | Rights | Edit | Del |
| 1⇅ Vice President | 1000 | Yes | 3 | 0 | Electives (0) | Required (0) | Competency | Rights | Edit | Del |
| 2⇅ Director | 750 | Yes | 2 | 0 | Electives (2) | Required (0) | Competency | Rights | Edit | Del |
| 3⇅ Associate | 500 | No | 2 | 1 | Electives (0) | Required (0) | Competency | Rights | Edit | Del |
| 4 Assistant | 250 | No | 0 | 2 | Electives (0) | Required (2) | Competency | Rights | Edit | Del |

Copyright © 2000-2001 CyberU Inc. All rights reserved. | 4/25/2001 9:08 PM | Corporate Administration Toolbar | Logout CYBER U | CES Administration

Toolbar: Users

Division: [ ] Level: [ ]
Last name: [ ] First name: [ ] Cost center: [ ] Location: [ ]
[Go]

Users: 1 - 10 out of 39 <<PREV NEXT>>
LEVELS IN THE CORPORATE SALES DIVISION

| Name: | Username | Division/Level | Cost Ctr | Manager | Location | Language | Rights | Edit | Del |
|---|---|---|---|---|---|---|---|---|---|
| Arche, Lisette | larche | Research: Senior Researcher | Main | Charles Coy | LA | English | Rights | Edit | Del |
| Bard, David | dbard | Tech: Developer | Main | Anthony Christopher | LA | English | Rights | Edit | Del |
| Bruzzone, Dan | dbruzzone | Research: Senior Researcher | Main | Charles Coy | LA | English | Rights | Edit | Del |
| Carlson, Piper | pcarlson | OSG: Associate | Main | Andrew Millard | LA | English | Rights | Edit | Del |
| Chase, Charles | rchase | Tech: Developer | Main | Anthony Chrisopoulos | LA | English | Rights | Edit | Del |
| Cheng, Andrew | acheng | Research: Manager | Main | | LA | English | Rights | Edit | Del |
| Cheung, Chris | cdheung | CEG Sales: Director | Main | Adam Miller | LA | English | Rights | Edit | Del |
| Christopoulos, Anthony | achristopoulos | Tech: Senior Developer | Main | Adam Miller | LA | English | Rights | Edit | Del |
| Cook, Kevin | kcook | OSG: Director | Main | Adam Miller | LA | English | Rights | Edit | Del |
| Coy, Charles | ccoy | Main: Administrator | Main | | | English | Rights | Edit | Del |

Add new user

CYBER U | CES Administration

Copyright © 2000-2001 CyberU Inc. All rights reserved. | 4/25/2001 9:08 PM | Corporate Administration Toolbar | Logout

FIG. 6

METHOD AND APPARATUS FOR A CORPORATE EDUCATION SYSTEM

BACKGROUND

1. Field of the Invention

The invention relates to an on-line corporate education system used to manage and administer corporate training throughout an enterprise. More specifically, the invention relates to extranet-hosted software which enables the centralized or decentralized administration, tracking, delivery and reporting of on-line, off-line and just-in-time training.

2. Background

In today's information-driven economy, economic success depends to a large degree on the education and training of the work force. Corporate spending on education has reflected this—U.S. corporations are estimated to spend over $98 billion on corporate training. However, with demands for additional training has come a desire to reduce the overall cost of training.

Distance learning via the Internet promises many advantages for corporations, including the ability for busy employees to choose the location and time convenient for learning. Presently, however, it is difficult to search for courses on the Internet since they are not cataloged in a uniform fashion. Furthermore, even if they were uniformly cataloged, sifting through a potentially large number of similar courses would be an unproductive use of an employee's time.

A second area of concern is the administrative cost of implementing Internet-based training in large organizations. The training requirements of large corporations differ across and within divisions. Division managers may require their employees to be highly specialized. The result is that similar divisions in a corporation may be taking entirely different approaches to employee training. This makes it difficult to implement a single training strategy and introduces administrative redundancy at every level of management. Furthermore, the task of assessing employees' skill level presents similar problems. Thus, a more efficient means is needed for corporations to implement Internet-based training.

DETAILED DESCRIPTION

Figure 1:
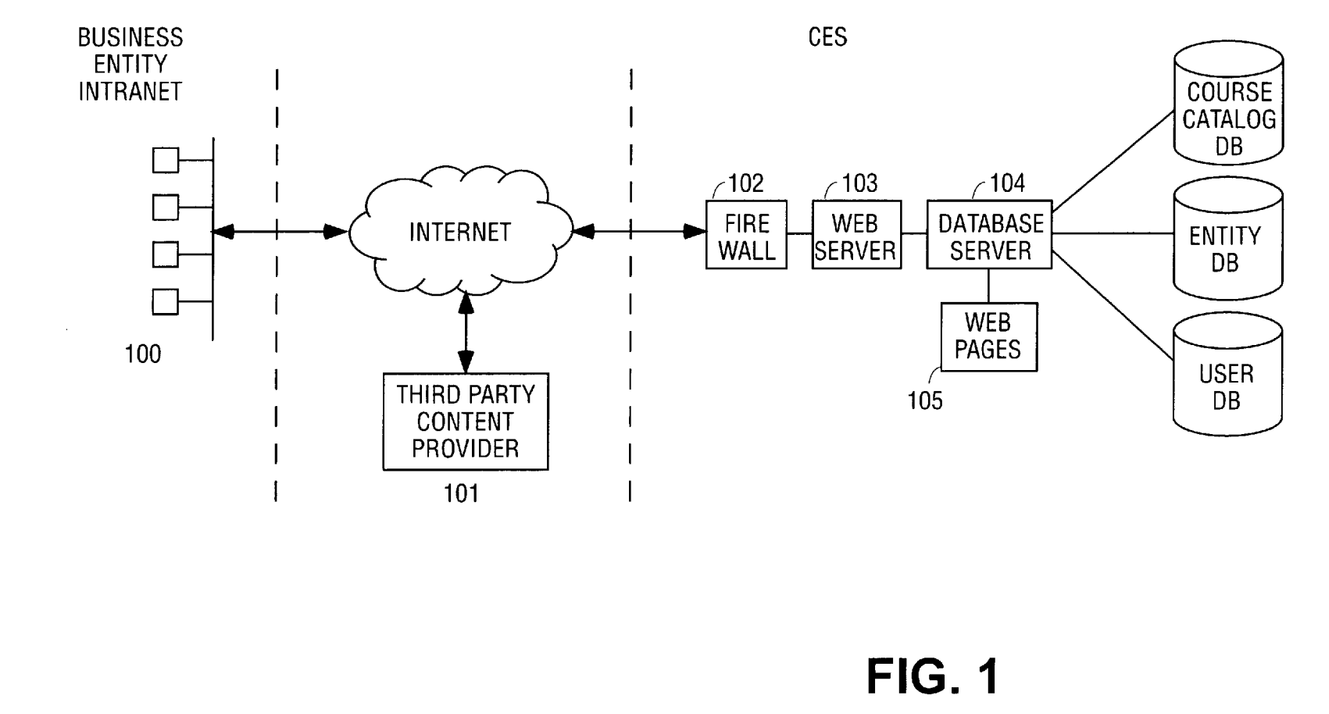
FIG. 1 is a block diagram a system of one embodiment of the invention.

FIG. 1 is a system overview of one embodiment of the invention. In one embodiment, The Corporate Education System ("CES") is comprised of one or more fire wall computers 102, one or more web servers 103, and one or more relational database servers 104. In one embodiment, The web server 103 runs Microsoft's Internet Information Server 4.0 and utilizes two 9 GB Ultra SCSI hard drives in a mirrored configuration. In one embodiment, Web pages interact with the Internet Information Server via Microsoft's VBScript language. In one embodiment, the database server 104 runs Microsoft SQL Server 7.0 and provides access to three normalized databases: a course catalog database 106, a user database 108, and an entity database 107. The databases are stored on three 9 GB Ultra SCSI hard drives in a RAID-5 configuration. The course catalog database 106 contains information on all on-line courses offered through CES, and may be organized by institution, college, school, department, course, and class. Courses may be provided by third parties 101, CyberU or a CES user. The user database 108 keeps track of individual employees and the courses they have registered for. Finally, the entity database 107 contains information specific to each business entity using the system and is discussed below. As used herein, "business entity" may mean corporation, limited liability company, partnership, sole proprietorship, non profit entity or any organization recognized under the law to conduct business. These terms may be used interchangeably herein. Accordingly, for example, discussions of "corporation" are deemed to apply to other business entities.

Users may access CES through a thin web browser on a corporate intranet 100. In one embodiment, no supporting software is required on the client side such that with appropriate password access, CES may be used from any node executing a conventional web browser. In one embodiment, the interfaces are written in Microsoft VBScript, JavaScript, and Hypertext Markup Language. CES has two separate user functionalities: 1) entity administration, and 2) employee knowledge portal, both of which are accessed through the employee knowledge portal interface. Through the entity administration functionality, the offerings through CES may be dynamically and individually limited to a subset of the total population of offerings through CES. The system administration toolbar may be used to create, edit, and delete entities from the entity database 107. In one embodiment, each business entity is represented by an entity object and is assigned its own individual database. Entities are treated programmatically as objects and methods are provided to store and retrieve object attributes from the underlying relational database. Since methods hide details about the underlying database, changing the database would require changing only those methods that access the database. In one embodiment, the entire CES appears to a user at the entity to be part of the entity's intranet when in fact it is entirely externally hosted.

In one embodiment, the software underlying the system enables the: (i) generation of personalized on-line corporate training centers for each user related to a corporation; (ii) automatic filtering of on-line training content based on corporate preferences; (iii) administration of assessments and competency gap analyses; (iv) assignment, approval and tracking of subordinate training by managers; (v) automated administration of instructor-led training, including scheduling, resource handling and registration; (vi) integration of third party and proprietary on-line courses; (vii) management of organizational knowledge transfer and just-in-time training selection; and (viii) dynamic generation of enterprise-wide reports.

Administrative Functionality

Figure 2A:
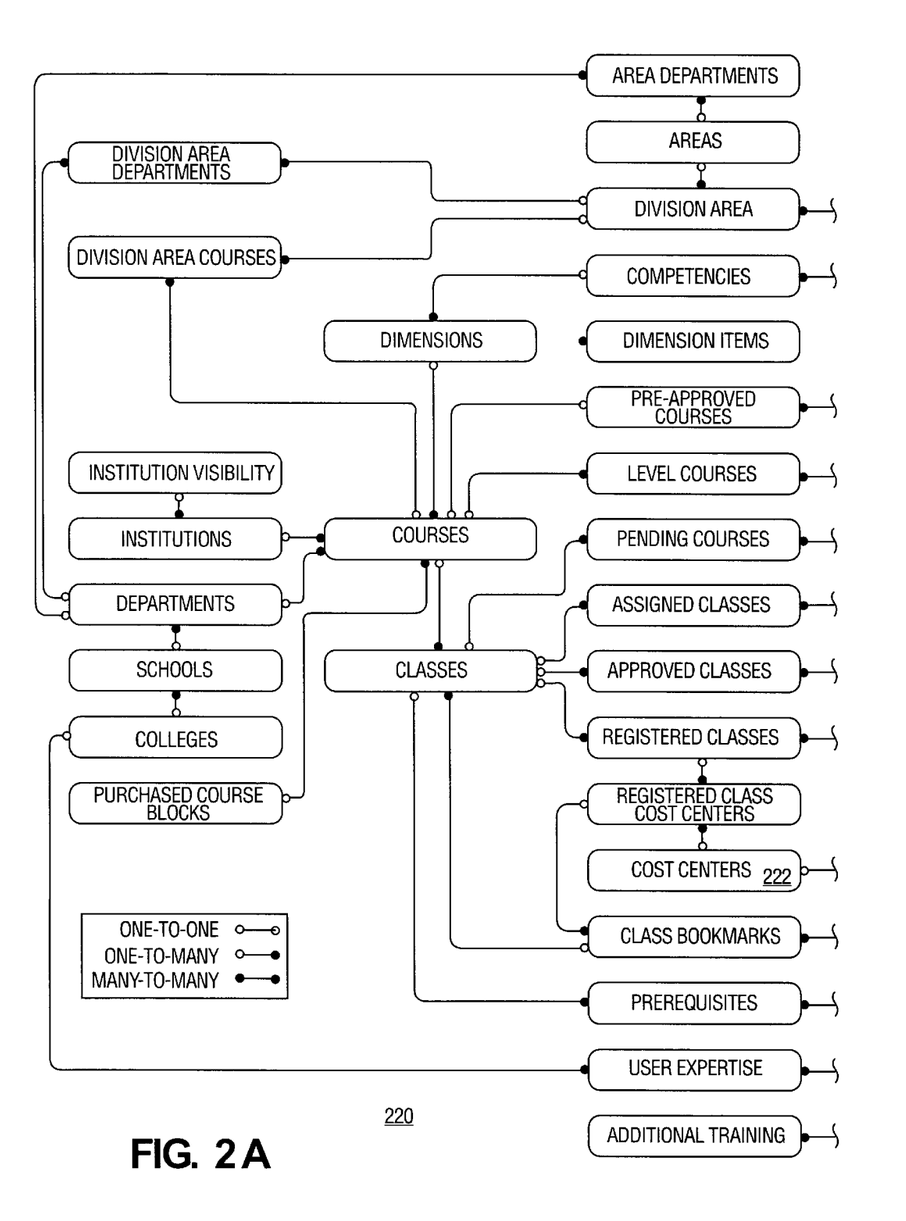
FIGS. 2A–C are an entity relationship data diagram for database modeling a business entity in one embodiment of the invention.
Figure 2B:
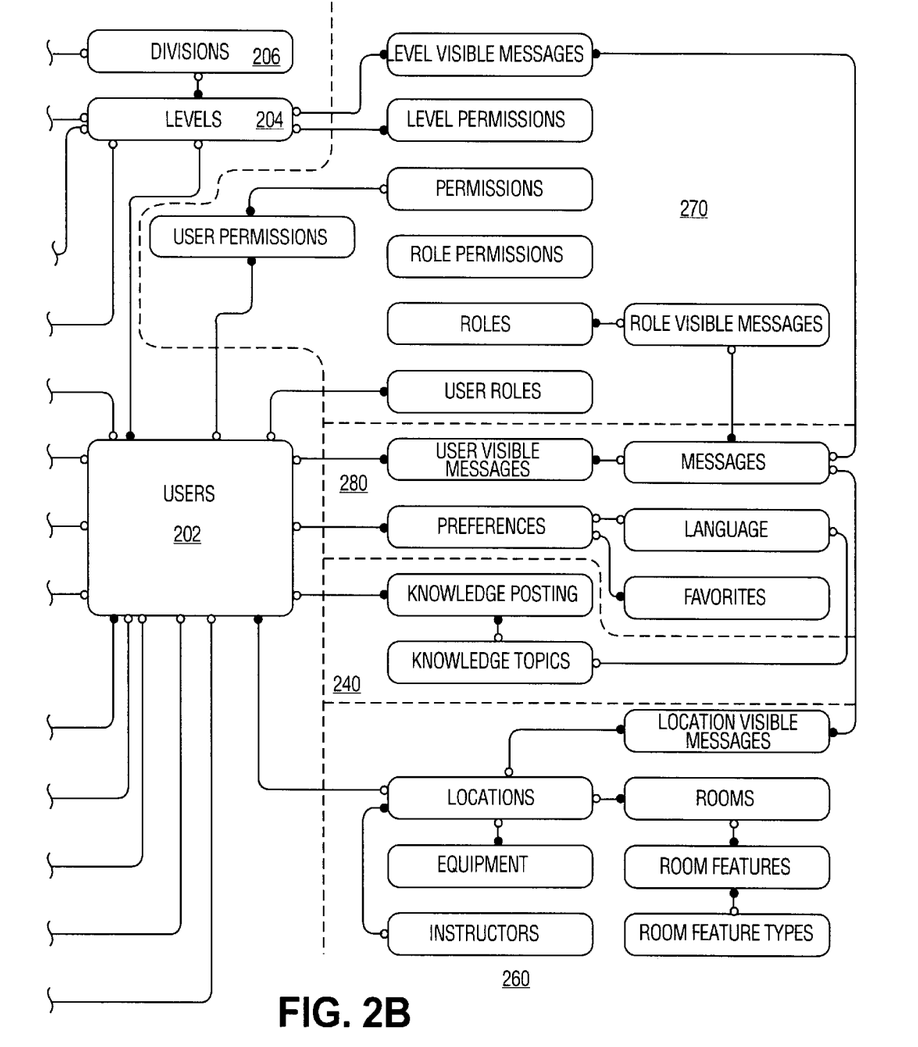
Figure 2C:
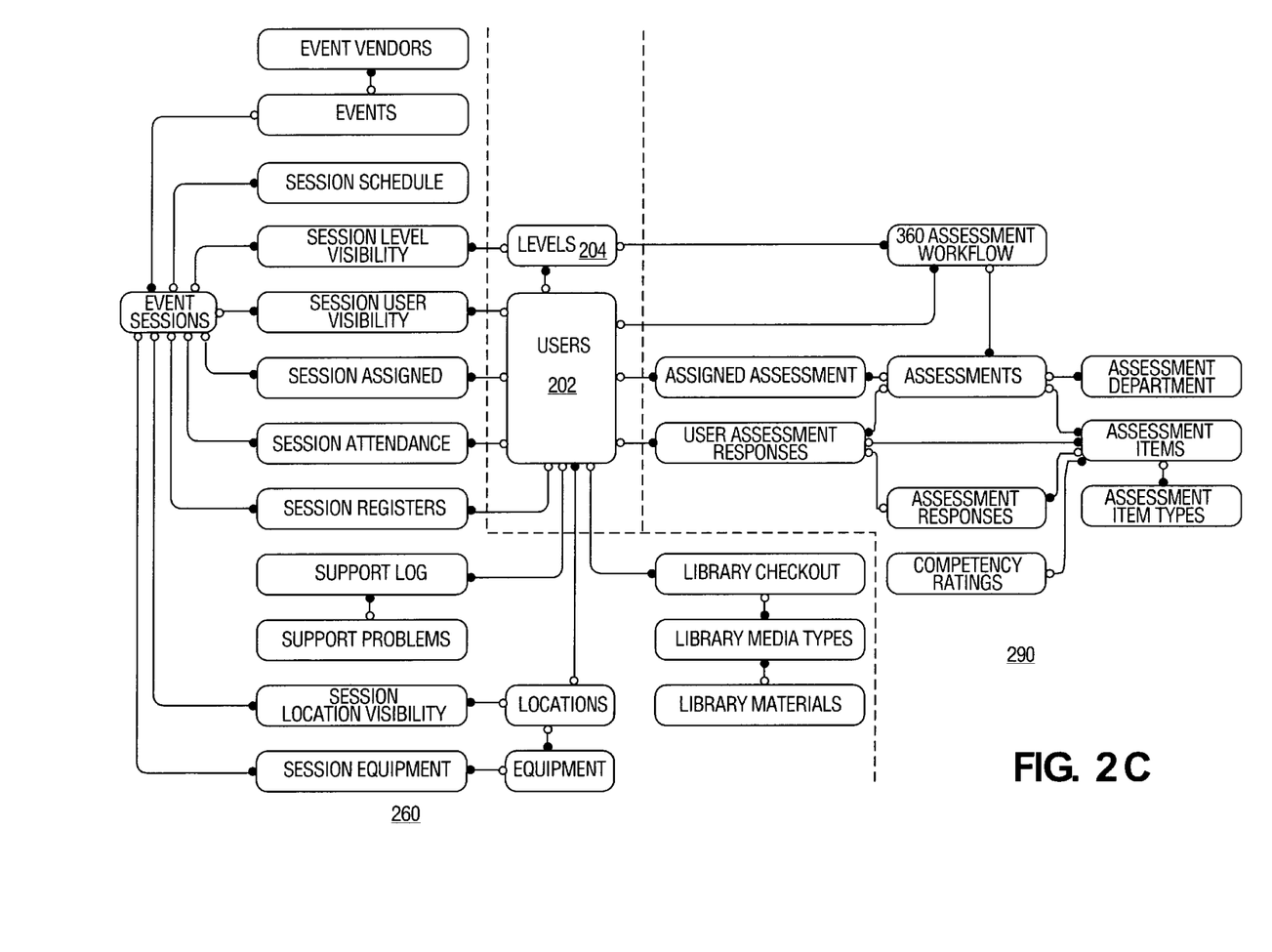

In one embodiment, a corporate administrator may "build" a corporation using virtual corporate objects that are available through the system. By using these objects, the corporate administrator will determine, among other things, which users have access to which courses, what rights users have, which cost center an employee is assigned to, which content providers, if any, are excluded from the course listing and which topics are addressable in the knowledge bank. FIGS. 2A–C are an entity relationship data diagram for database modeling a business entity in one embodiment of the invention. Central to the entity model and unique to each entity is a users table 202 which contains a unique object for each user within the entity permitted access to the system. Also, unique to each entity is levels table 204 which defines a user's level. Level of the user might be regarded as analogous to pay grade or job function (e.g., administrative, management, upper management, etc.). Level is related to a division within the entity. Divisions are defined in the divisions table 206. The on-line training portion of the database is diagramed as section 220. Section 220 includes a table that reflects the available classes, courses (curriculum) as well as requirements and approval facilities for the on-line training. Cost centers table 222 is provided to track all training associated costs incurred through use of this system. Section 270 includes a number of tables used to establish user rights. Section 280 contains tables of user preferences and user modifiable options. Section 240 relates to just in time training and includes tables related to knowledge postings and knowledge topics for the knowledge bank. Section 260 includes off-line training related to tables including section registrations, event scheduling, equipment allocation and off-line material acquisition tables. Section 290 includes competency assessment tables to permit users to be assigned assessments or do self-assessments. The assessments assist managers in assigning on-line or off-line training based on those assessments. This database architecture modeling the corporation yields an extremely flexible scalable environment that can be uniquely tailored to any individual corporation. Users, their rights, levels, divisions, etc., may all be customized by the administrators. Division names can be selected by an administrator without changing the relationship between objects. This administrative functionality is not limited to entity wide administration or even division wide administration, but rather may be employed down to the individual user level, through modification of the relationship between objects. Functional interactions of the database are discussed in more detail below.

Figure 3:
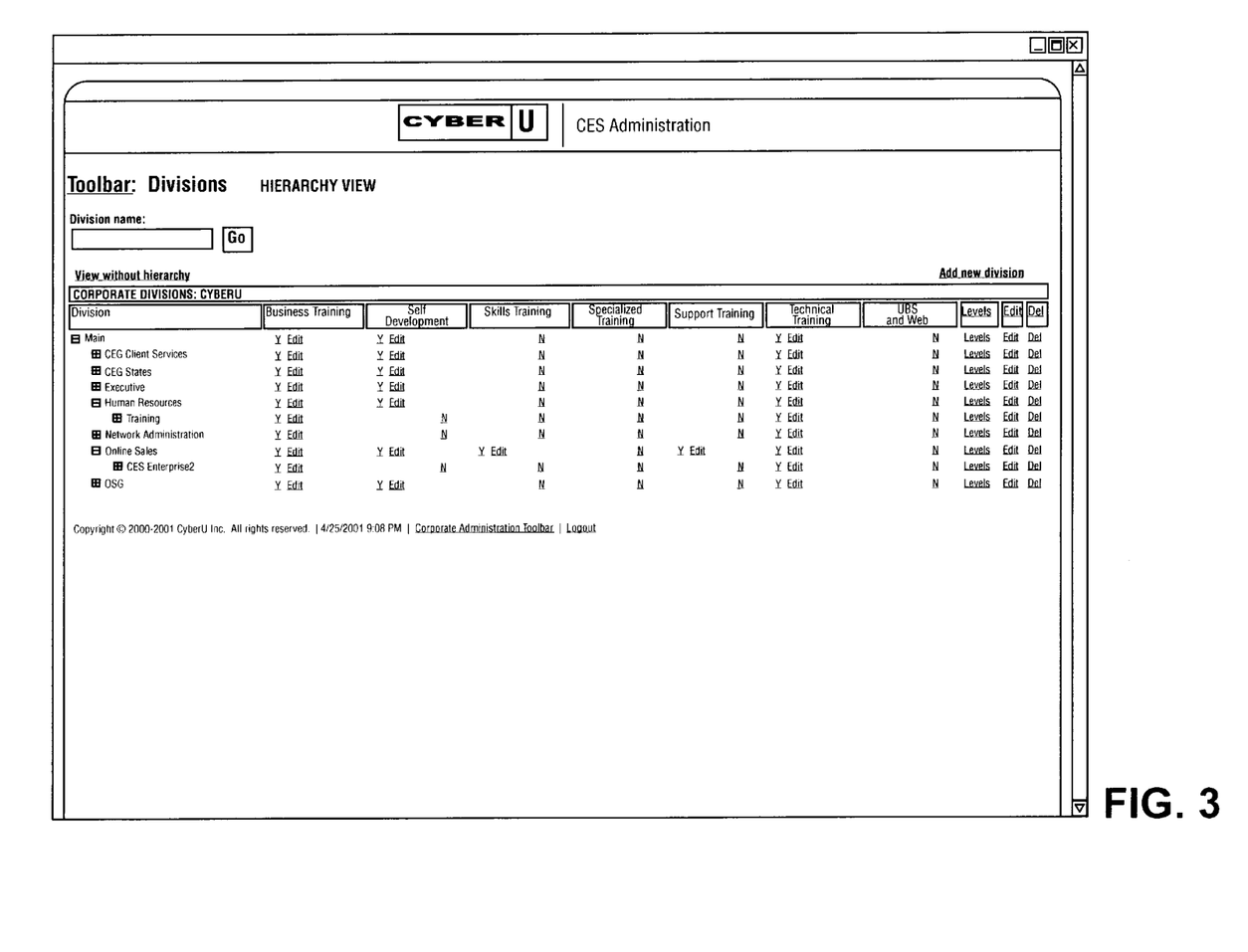
FIG. 3 is one depiction of the corporate personalization functionality for modifying divisions in one embodiment of the invention.

FIG. 3 is one depiction of the corporate administration functionality for adding, deleting or modifying divisions in one embodiment of the invention. The corporate administration interface is used to customize information regarding corporations and corporate employees. A division represents a subset of a corporation such as CEG Client Services, CES Sales, Executive, Human Resources, etc. Divisions are stored in the divs table. Divisions are represented by a primary key including a of div_id. Each division has a name and an optional parent division. This allows for creating unlimited levels of subdivisions within a division. Thus, in one embodiment, the division is represented by a recursive object. In FIG. 3, for example, the Training division is a subdivision of the Human Resources Division and CES Enterprise2 is a subdivision of Online Sales.

Divisions may have access to the on-line content in various training areas. An area is a predefined group of academic departments, such as Business, Technical, Skills, Self Development, Specialized Training and Support Training. Areas are stored in an areas table using area_id as the primary key. In one embodiment, areas may be added, edited, or deleted directly through the database's own entity administration user interface. The corporate administrator has the ability to allow a division to have access to an area or may prohibit a division from accessing an area. For example, a corporate administrator will likely permit the Finance division to access the Business area, but is not likely to allow the Finance division to access the Technical area.

Each area contains one or more departments. A department represents a pre-defined set of courses. For example, the Technical Training area may include the following departments: Computer Graphics, Hardware, and Web Development. Computer Graphics might contain courses in Open Graphics Language, 3D Rendering Techniques, etc. CES stores default departments for each area in the areas_depts table. As with areas, departments can be added, edited, or deleted through the database's own user interface. A "default" corporation provides the initial default areas and departments available to a corporation. The corporate administrator can override the default department assignments by specifying which departments are available to a given area for a particular division in the divs_areas table. The corporate administrator can further customize the available courses by looking beneath the department level to the course level and determining which courses in a particular department should be made available in a particular area for a particular division.

Figure 4:
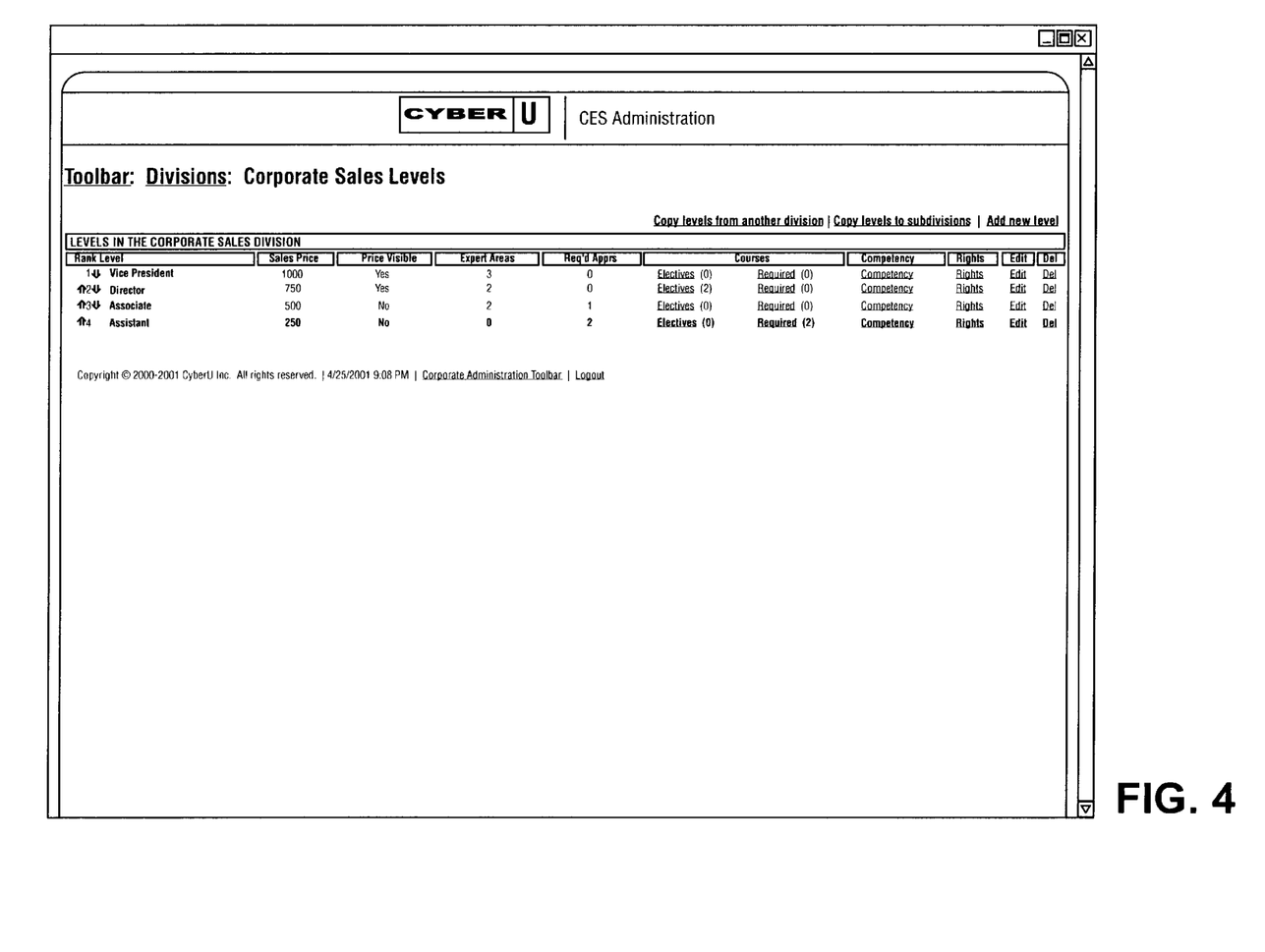
FIG. 4 is one depiction of the corporate personalization functionality for modifying levels in one embodiment of the invention.

Each division can be categorized into levels. FIG. 4 is one depiction of the corporate administration functionality for modifying levels in one embodiment of the invention. A level represents a corporate employee's vertical position within a division of the corporation, such as Vice President, Director, Associate or Assistant, etc. Levels can be added, deleted or edited through the database's own user interface.

The corporate administrator can assign a maximum price to each level and thereby prevent employees from viewing or enrolling in courses above that price. Additional attributes of a level include whether or not the course price is visible to employees within that level, the maximum number of expert areas an employee can assume and the number of approvals that are required for an employee of a particular level within a particular division to enroll into a course. A level can also be assigned a set of courses which is accessible by all employees within that level. The administrator can pre-approve particular courses so that users do not have to follow the approval process otherwise required for that level. Administrators can also assign sets of competencies to different levels. Finally, each level has an associated set of system rights (e.g., the right to post off-line events, view reports and become a knowledge bank administrator). When the administrator adds a user to a given level, the system grants the new user the default rights for that level. Administrators can later customize those rights by user. In sum, employees can access courses available in their division as further limited by their level. Levels are stored in a levels table and have a primary key consisting of level_id. Courses are associated with levels in the levels_courses table.

A cost center is assigned to employees and used by a corporation to track training budgets. A cost center has an identification number and a name, which allows for creating an unlimited number of sub cost centers within a cost center. Cost centers can be added, edited, or deleted by the corporate administrator. The cost_centers table houses the cost center information.

Facilities consist of locations and instructors. A location represents an office or physical branch of a corporation. An instructor is a person who teaches an off-line course or leads an off-line event, but is not necessarily an employee of the company. A location has an identification number, a name, and a time difference. In one embodiment, the time difference is a positive or negative offset in hours from the general mean time. Time differences are required to calculate the time of day an employee at a given location accesses the system. This allows corporate administrators to control when employees can use the system. Location information is stored in a locations table.

Instructors are also categorized by their location. Instructors are further defined by their employer, whether it is CyberU, a CES customer or a third party and their area of expertise. Instructor names, location, employer and area of expertise can be added, modified or deleted by the corporate administrator.

Rooms and equipment may be assigned to a location. The room feature provides the user with information regarding the room such as its capacity, the type of room and the features of the room. The equipment feature provides the user with information regarding the number and type of equipment located within the room such as laptop computers, whiteboards, pad and pen sets, coffee service, television/VCR and teleconferencing sets. The corporate administrator can add, modify or delete the rooms and equipment features. Room and equipment information is stored in the rooms and equipment tables, respectively.

Figure 5:
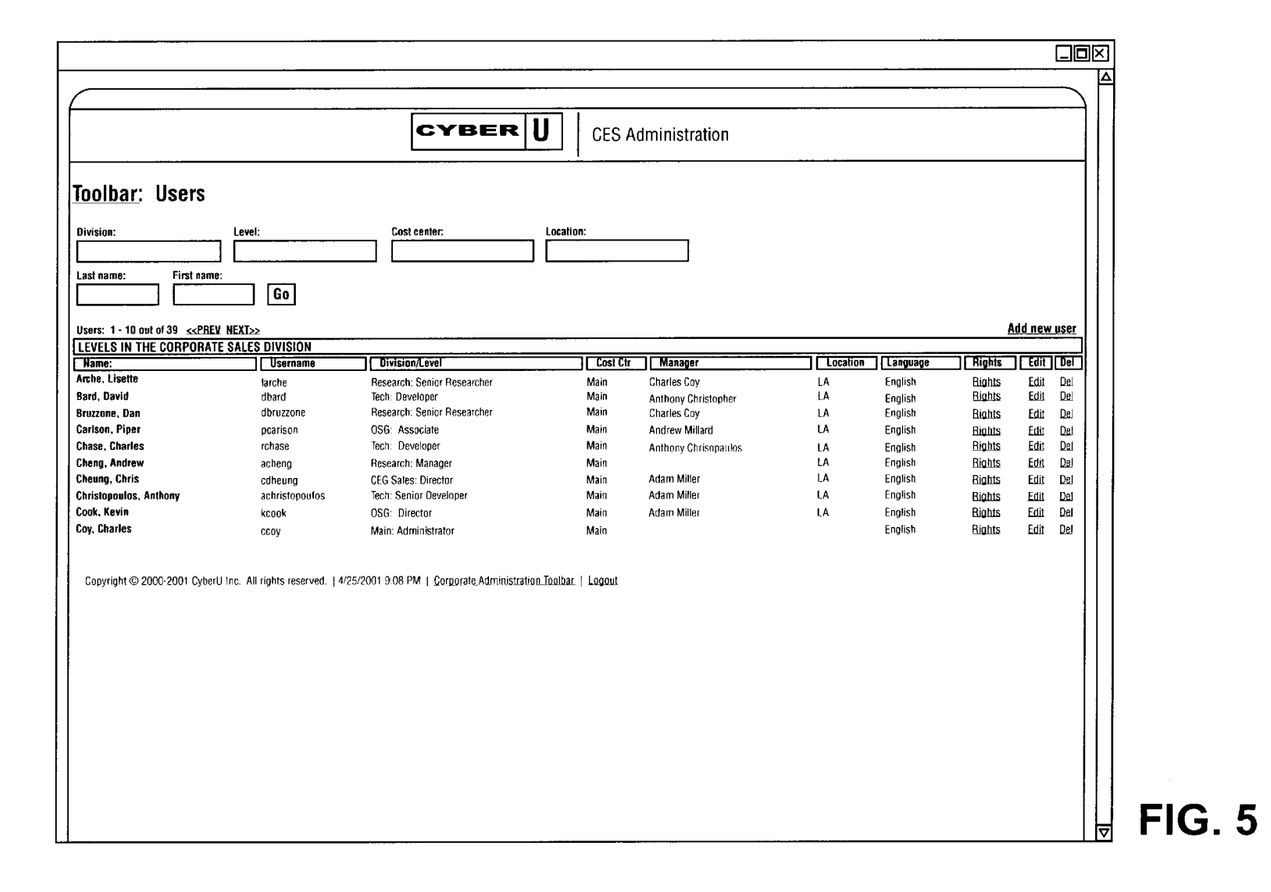
FIG. 5 is one depiction of the corporate personalization functionality for modifying users in one embodiment of the invention.

FIG. 5 is one depiction of the administration functionality for modifying users in one embodiment of the invention. A user is a corporate employee. Users are assigned to a division, level, cost center, and location. Users may also be assigned a manager. The user's manager is designated by the user_mgr_id field, which references another user_id. User information is stored in a users table, which has a primary key consisting of user_id. A user record has foreign keys to the divs, levels, cost_centers, and locations tables. The corporate administrator can further enable employees with access to all of particular content provider's courses, or, should the corporate administrator desire, the administrator can deny employees access to all of a particular content provider's courses. The list of content providers is stored in the institutions table.

Each user also has a designated language and an enumerated list of rights, both of which will affect the user's customized knowledge portal that is described below. In one embodiment, CES stores static phrases that appear on its web pages in four languages (English, German, French, and Spanish), any number of languages are within the scope and contemplation of the invention. In one embodiment, when a user accesses a CES web page, it is displayed in the language designated for that user. The phrases table stores every static phrase used on the web site in each supported language. A phrase_name identifies the phrase. The various translations are stored in fields specific to a language.

In one embodiment, individual user "rights" can be designated by the corporate administrator for each employee within a level. Rights include the right to post an event to the calendar, the right to view various types of reports of training and the right to be a knowledge bank administrator. In one embodiment, competencies can be assigned by the administrator for each level of employee. Competencies are comprised of dimensions, items and courses. Rights and competencies can be added, modified or deleted by the administrator.

In one embodiment, a corporate administrator can define knowledge bank topics. The knowledge bank is an open forum where users can post comments, advice, questions, white papers, technical bulletins, etc., and responses to such questions, comments, etc. as well as access just in time training in the form of learning objects or bits. The corporate administrator defines topics in the corp_bank_topic table. Topics have unique identifiers and can be modified or deleted by the administration. In some embodiments, questions posted are automatically routed to an employee designated as an expert. The expert may be known or unknown by the user posting the question. Expert status may be attained by self designation or successful completion of an assessment as discussed below.

Employee Knowledge Portal Functionality

Figure 6:
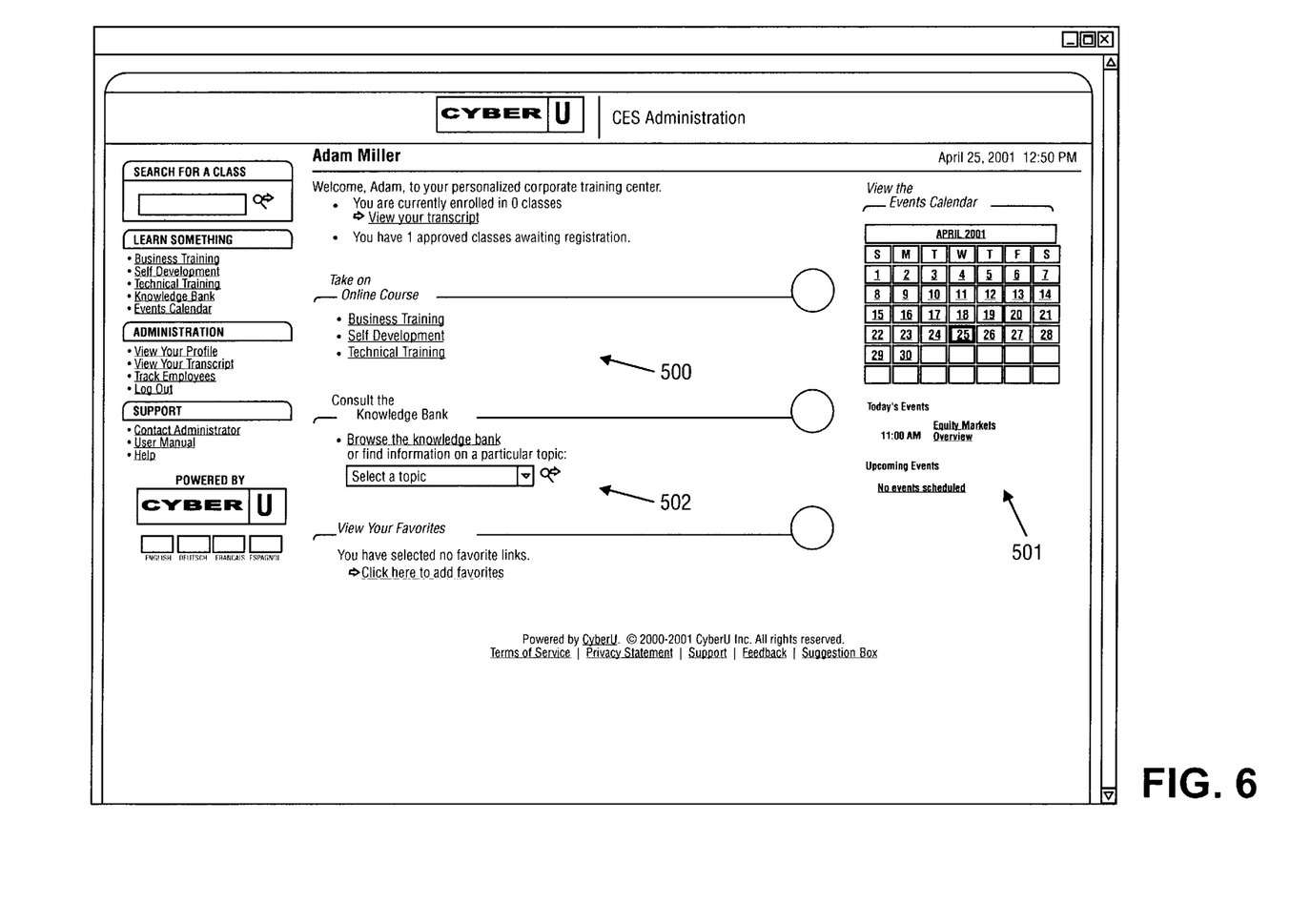
FIG. 6 is one depiction of the corporate employee functionality in one embodiment of the invention.

FIG. 6 is one depiction of the corporate employee functionality in one embodiment of the invention. The interface provides integrated access to on-line, off-line and just in time training. Once the corporate administrator has customized CES databases, a user can log onto the system and browse through the available courses, request courses for which their division and level have access, and upon the manager(s) approval, register for such approved courses. On-line training is accessed through on-line interface 500 which provides links to available on-line course offerings. By traversing the link, a user is presented with a set of course choices relevant to the user's division and level in the corporation. A user can obtain a detailed description of the course, instructor, provider, prerequisites, duration, pace, required equipment and other relevant information. A user can request a course by clicking on a button on the page and the request is automatically routed to the appropriate managers for approval. In addition, a course, courses, or a curriculum can be assigned to the user by the user's manager. As used herein, curriculum is deemed to mean an ordered set of courses with or without deadlines for completion.

Managers can access the employee tracking page of the web server periodically to approve or deny users' registration choices for courses or assessments. Once registration is approved, the user is notified and can begin taking the course. In one embodiment, the system notifies the manager when courses are pending approval. This notification may be passive, e.g., only perceptible if the manager logs on to CES or active such as by paging or e-mail external to CES. An employee can also add his or her favorite internet links to his or her home page.

Off-line training is managed through an events calendar 501. The events calendar 501 may reside on a web server to allow users to schedule, remove, register for, or modify announcements of off-line courses, lectures, seminars, etc., through a web-based interface. Events are stored in the corporate database 107. Events have a name, date, description, starting and ending times, physical location, an indication of whether facilities and equipment will be required, instructor, price, maximum number of users that can register, the last charge date, and an indication of whether or not the event is visible to users outside the location. If an event is oversubscribed, a waitlist is automatically generated and managed. Managers have the ability to invite employees to off-line events on the basis of division, level, location and/or user name, and the employees are notified through their personalized events calendar and may be reminded of such events by e-mail. User registration in off-line courses can also be tracked. In one embodiment, user rights may include the right to post events to an events calendar and the right to view corporate-wide reports. Further, a user can request that certain events be held, and the system tracks such requests to assist the administrators in determining which events to hold for the corporation.

An integrated facilities management system augments the events calendar. As discussed above, administrators can establish facilities, rooms, equipment and instructors from which those employees granted rights to schedule events may chose. An employee with such rights has the ability to request those facilities, equipment or instructors during the scheduling of a new event. Any conflicts are immediately identified and remedied by the system. A room finder enables a user to input required items and the room finder locates available rooms and sends a message to the office manager of the request for a particular room. The system ensures no conflicts between allocation of physical resources. In one embodiment, the system notifies a user posting the event of a possible conflict. In another embodiment, posting a conflict event is not permitted. The user may also check out physical resources such as library books, software, etc. through the system. The system then tracks possession of the resource until it receives an indication that the item has been returned. In one embodiment, the resource object is associated with the possessing user object until the item is returned at which point it is marked as not in use.

Just in time training is managed through the knowledge bank interface 502. The knowledge bank features a forum in which users can participate in corporate-wide discussions. Users access the knowledge bank web page through a web-based interface. Discussions are organized by topic (or "thread"). Users participate in a discussion by posting messages (events) on the knowledge bank web page. Each posting is visible to all users in the corporation. A discussion thread can be comprised of "sub-threads" which tangentially explore related topic areas. Discussion threads can also be used to disseminate comments, advice, white papers, presentations, and course materials. Discussion threads are stored in the corporate database and indexed by topic. The knowledge bank web page also provides an "ask the expert" page that allows users to direct questions to other users designated as departmental experts. In one embodiment, such questions are sent directly and automatically to the designated experts and may not identify the experts. In another embodiment, the user may select from the available experts which may be identified and rated possibly based on the on-line assessments discussed below.

Users may also access the knowledge bank to find relevant learning objects or learning bits for just-in-time learning. In one embodiment, classes are represented as learning objects. The learning objects are separated, those segments are referred to herein as "learning bits." Learning bits correspond to subsections of the class represented by the corresponding learning object. These short (e.g., 5 minute) segments are indexed and searchable through the knowledge base. This permits the user to search for a learning object or a learning bit for just in time training depending on the scope of the training needed. For example, a calculus course may involve several hours of lecture while a user for just in time training may only wish to download a five minute segment on l'Hôpital's Rule.

In one embodiment, CES allows employees to designate themselves as experts in departments from which they can take classes. In addition, an assessment test may be used to evaluate and establish an employee's competency in one or more areas. An entity can develop competencies for specific jobs at the company. For each competency, an assessment can be used to test the user for the competency. Based upon the results of the assessment, CES will dynamically generate training designed to offset any deficiencies found in the assessment testing. Alternatively, CES may determine a user's competencies by querying a co-worker about a user's skills in a particular area. "Co-worker" is deemed to include managers, peers and even consultants. Based on the co-workers' evaluation(s), CES will dynamically generate training designed to offset any deficiencies found in this type of review.

As noted above and further described below, managers and those granted rights by the corporate administrator have other features available to them, which may include without limitation, reviewing pending requests for training, assigning courses, assessments and competencies to subordinates, tracking learning, posting instructor led events to the events calendar and viewing various types of reports.

Once a corporation is modeled through divisions, areas, departments, and courses, managers need to identify which of their employees require training. As previously discussed, CES facilitates this activity through either its competency management system or its testing and assessments area. Managers can assign 360 degree competency tests to individual users based upon the dimensions and evaluative items that comprise the particular competency to determine competency gaps. This feature allows a manager to select pre-existing competencies or create new ones from scratch. Based on an employee's test results, managers may assign specific courses to their employees. Alternatively, a manager can assign subject based tests to employees. These tests can either be third party tests or custom created by the manager in conjunction with the test facilitator. The results are made available to the employees and their manager(s).

Managers also have the ability to track other employees' training and to assign training to other employees. The track employees feature allows the supervisor to view pending requests for courses from subordinates and either approve or deny such requests, view the training that his or her employees are taking and to view, assign or create assessments for his or her subordinates.

An expense report page of the web server allows for tracking of expenses. In one embodiment, CES can generate expense reports on the fly for all employees at the divisional, functional, or cost center level. In addition, CES can generate expense reports for individual employees. Managers who were assigned the right to view reports can view expense reports, usage reports, class statistics reports and cost center reports. In one embodiment, the usage reports allow a manager to group the reports by users, IP addresses or page names. In one embodiment, class statistics can be run for institutions, classes or prices and ordered alphabetically or numerically.

Users have the ability to constantly provide feedback regarding the system and the courses that such a user has completed. Upon completion of a course, the user is automatically requested to fill out a course evaluation form. The course ratings are posted to allow future users to learn the courses' rating. The users' training history is retained in the CES and an employees' superiors with appropriate access rights may be permitted to view the training history.

Using the described system, personalized training can be administered scalably across a small or large enterprise in an efficient manner. In the foregoing specification, the invention has been described with reference to specific embodiments thereof. It will, however, be evident that various modifications and changes can be made thereto without departing form the broader spirit and scope of the invention as set forth in the appended claims. The specification and drawings are, accordingly, to be regarded in an illustrative rather than a restrictive sense.

We claim:

1. A system to manage training across a business entity comprising:

a relational database to uniquely model a business entity;

a course catalog database containing an aggregation of course offerings available to employees of the business entity;

a plurality of user objects each corresponding to an employee at the business entity retained as part of the model; and a web server to serve web pages dynamically generated responsive to preferences contained in the model.

2. The system of claim 1 further comprising:

a knowledge bank for the business entity, the knowledge bank permitting posting of resources by users within the business entity related to defined subject areas.

3. The system of claim 2 wherein a resource comprises one of:

a question related to a subject area;

an answer to a prior question;

technical information about a subject area; and a notice of a resource related to a subject area.

4. The system of claim 2 wherein when a question resource is posted to the knowledge bank, the question resource is automatically associated with a user object having expertise in the subject area.

5. The system of claim 1 wherein each user object is associated with a cost center within the model such that cost incurred by a user by accessing a course from the course catalog are automatically allocated to the associated cost center.

6. The system of claim 1 wherein the model defines access rights for each user object within the model.

7. The system of claim 1 wherein the model defines a subset of offering from the course catalog be available to a user based on at least one of level, division, location, cost, offering institution and current competency.

8. The system of claim 1 wherein the model comprises:

a competency assessment module to determine a users competency in at least one area.

9. The system of claim 8 wherein the competency assessment module assesses competency by at least one of collecting evaluations of co-workers and administering an assessment in at least one area.

10. The system of claim 1 wherein the model comprises:

an on-line training module to provide access to on-line training offerings;

an off-line training module to facilitate scheduling and posting of off-line training offerings; and a just in time training module to permit at least one of on demand access to experts within the enterprise and on demand access to just in time learning objects.

11. The system of claim 1 wherein each user object is assigned default rights based on a division and a level of a corresponding employee and is independently customizable to define rights of the user outside the scope of the default rights.

12. A computer readable storage media containing executable computer program instructions which when executed cause a digital processing system to perform a method comprising:

aggregating a population of training offerings;

generating a virtual model of a business entity;

establishing relationships for a plurality of user objects within the model each user object having a unique identifier and corresponding to an employee of the business entity; and enabling access by a user at the business entity to a subset of the population based on criteria defined in a corresponding user object.

13. The computer readable storage media of claim 12 which when executed cause a digital processing system to perform a method further comprising:

dynamically generating a web page consistent with preferences and rights related to the user object corresponding to a user; and serving the page to the user in a form viewable with a thin web browser.

14. The computer readable storage media of claim 12 which when executed cause a digital processing system to perform a method further comprising:

establishing a set of manager rights including at least one of approving or disapproving on-line or off-line course registration for a subordinate user; assigning assessments to a subordinate user; and assigning training to a subordinate user.

15. The computer readable storage media of claim 12 which when executed cause a digital processing system to perform a method further comprising:

receiving a posting to a subject area of knowledge bank of the business entity; and notifying an expert in the subject area if the posting is a question.

16. The computer readable storage media of claim 12 which when executed cause a digital processing system to perform a method further comprising: determining a competency of a user by one of administering a competency assessment test to the user and collecting at least one evaluation of the user from at least one co-worker; and assigning a competency rating to the user at least partially based on the evaluation or assessment test.

17. The computer readable storage media of claim 12 which when executed cause a digital processing system to perform a method further comprising:

associating events and users with physical locations; and granting a user at a physical location access to an events calendar for the location including at least some of the right to:

add, modify, and delete an event;

register for an event;

record attendance at an event;

view a months worth of events;

send a message to event invitees;

request facilities and equipment for an event;

waitlist for an event; and request a not yet scheduled event.

18. The computer readable storage media of claim 12 which when executed cause a digital processing system to perform a method further comprising:

receiving from a user an indication of intent to register for an offering; and registering the user for the offering if authorized by a manager.

19. The computer readable storage media of claim 12 which when executed cause a digital processing system to perform a method further comprising:

automatically generating a cost report responsive to an authorized user request.

20. A method comprising:
aggregating a population of training offerings;
generating a virtual model of a business entity;
establishing relationships for a plurality of user objects within the model each user object having a unique identifier and corresponding to an employee of the business entity; and
enabling access by a user at the business entity to a subset of the population based on criteria defined in a corresponding user object.

21. The method of claim 20 further comprising:
establishing a set of manager rights including at least one of approving or disapproving on-line or off-line course registration for a subordinate user;
assigning assessments to a subordinate user; and
assigning training to a subordinate user.

22. The method of claim 20 further comprising:
filtering the population of training offerings by at least one of employee level, employee division, course cost, employee expert area, and course institution; and
serving a listing of at least a subset of a filtered population to a user.

23. The method of claim 20 further comprising:
receiving from a user an indication of intent to register for an offering; and
registering the user for the offering if authorized by a manager.

24. The method of claim 23 further comprising:
automatically forwarding a request for approval to a manager of the user responsive to the indication of intent to register.

25. The method of claim 20 further comprising:
associating events and users with physical locations; and
granting a user at a physical location access to an events calendar for the location including at least some of the right to:
add, modify, and delete an event;
register for an event;
record attendance at an event;
view a months worth of events;
send a message to event invitees;
request facilities and equipment for events;
waitlist for an event; and
request a not yet scheduled event.

26. The method of claim 25 further comprising:
notifying the user if promoted from a waitlist;
resolving conflicts between request for one of facilities and equipment; and
generating a forecast of interest in a not yet scheduled event.

27. The method of claim 20 further comprising:
receiving a posting to a subject area of knowledge bank of the business entity; and
notifying an expert in the subject area if the posting is a question.

28. The method of claim 20 further comprising:
aggregating a population of learning objects;
indexing the learning objects; and
providing access on demand to the learning object.

29. The method of claim 20 further comprising:
administering one of a locally created test and a third party provided test to a user; and
evaluating results of the test.

30. The method of claim 20 wherein enabling comprising:
dynamically generating a web page consistent with preferences and rights related to the user object corresponding to a user; and serving the page to the user in a form viewable with a thin web browser.

31. The method of claim 20 further comprising:
determining a competency of a user by one of administering a competency assessment test to the user and collecting at least one evaluation of the user from at least one co-worker; and
assigning a competency rating to the user at least partially based on the evaluation or assessment test.

32. The method of claim 20 further comprising:
maintaining a history for a first user reflecting prior access to members of the population; and
serving the history to a second user responsive to a request form the second user.

33. The method of claim 20 further comprising:
automatically generating a cost report responsive to an authorized user request.

34. The method of claim 20 further comprising:
aggregating training costs due to access to the population by the plurality of users at the business entity; and
invoicing the training cost such that aggregate costs are paid by the business entity to one recipient.

35. The method of claim 20 further comprising:
accepting a request for a physical resource of the business entity not already in use; and
tracking possession of the physical resource until receiving an indication that the resource has been returned.

36. A method comprising:
establishing a set of user preferences and rights defined for an entity of which the user is an employee;
receiving a dynamically generated web page viewable through a thin web browser conforming to the user preferences and rights, the web page permitting access to an aggregated population of training offerings.

37. The method of claim 36 wherein the rights include at least one of approving or disapproving on-line or off-line course registration for a subordinate user; assigning assessments to a subordinate user; and assigning training to a subordinate user.

38. The method of claim 36 further comprising:
posting to a subject area of a knowledge bank of the business entity; and
transmitting the posting to an expert in the subject area if the posting is a question.

39. The method of claim 36 further comprising:
receiving a competency assessment test as part of the web page;
responding to the competency test; and
receiving assigned training as a result of the responding.

40. The method of 36 further comprising:
accessing an events calendar for the business entity to at least one of associating events and users with physical locations; and
granting a user at a physical location access to an events calendar for the location including at least some of the right to:
add, modify, and delete an event;
register for an event;
record attendance at an event;
view a months worth of events;

send a message to event invitees;
request facilities and equipment for an event;
waitlist for an event; and
request a not yet scheduled event.

41. The method of claim 36 further comprising:

browsing a training offering within the population; and registering for the offering through the thin web browser.

42. The method of claim 36 further comprising:

requesting a cost report on one of a user, a level and a division basis; and receiving the cost report displayable through the thin web browser on a basis request.

43. The method of 36 further comprising:

providing a competency indicator by one of taking an assessment test on-line through the thin web browser and submitting an evaluation of a third party through the thin web browser; and receiving an indication of competency rating drive from a result of the assessment test.

44. The method of 36 further comprising:

taking one of a locally created test and a third party provided test on-line through the thin web browser; and submitting the test for evaluation.

* * * * *